(No Model.)
J. O. JOYCE.
TELESCOPIC JACK.
No. 389,475. Patented Sept. 11, 1888.
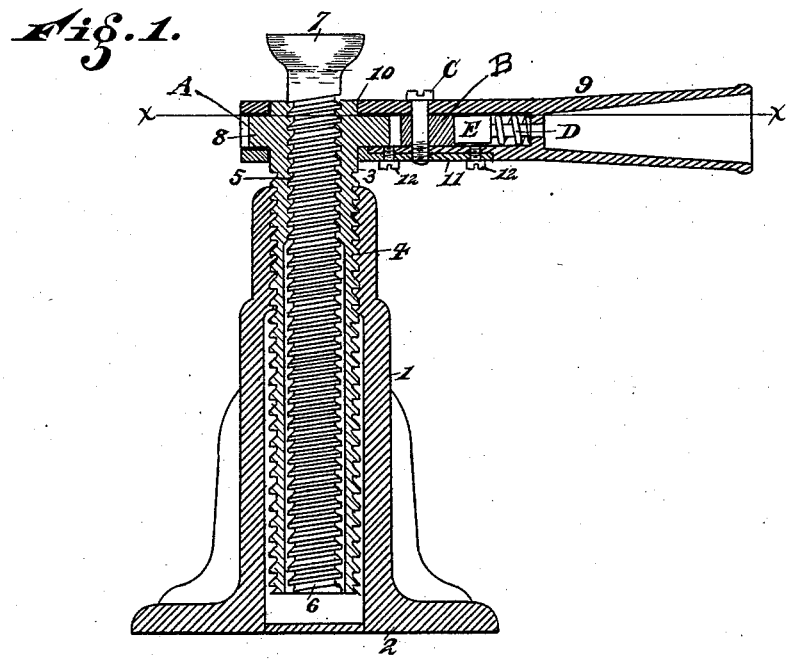
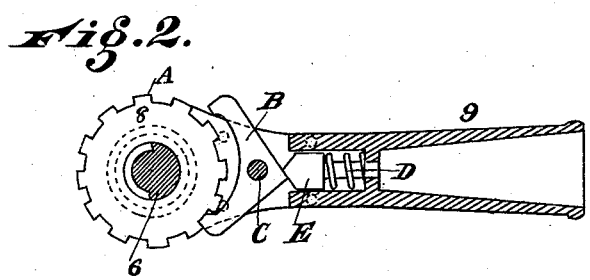
Attest
J. Watson Sims
T. Simmons
Inventor
Jacob O. Joyce
by Wood & Boyd
his Attorneys

UNITED STATES PATENT OFFICE.

JACOB O. JOYCE, OF DAYTON, OHIO.

TELESCOPIC JACK.

SPECIFICATION forming part of Letters Patent No. 389,475, dated September 11, 1888.

Application filed June 28, 1888. Serial No. 278,475. (No model.)

*To all whom it may concern:*

Be it known that I, JACOB O. JOYCE, of Dayton, in the county of Montgomery and State of Ohio, have invented certain new and useful Improvements in Telescope Jacks, of which the following is a specification.

My invention relates to a means for operating a telescopic screw-jack.

The object of my invention is to provide ready and quick means for operating the nut of the lifting-screw, the features of which will be fully set forth in the description of the accompanying drawings, making a part of this specification, in which—

Figure 1 is a central vertical section of my improvement. Fig. 2 is a section on line $x\,x$, Fig. 1.

1 represents the cylinder or frame of an ordinary telescopic screw-jack.

2 represents the base.

3 represents a cylindrical double-threaded screw, the outer thread engaging with the threads 4 formed on the inner periphery of the frame 1, and the inner threads, 5, engaging with the threads formed on the screw-rod 6.

7 represents a cap on the top of the screw-rod 6, on which the load rests.

8 represents a cylindrical journal formed on the outside and the top of the cylindrical double-threaded screw 3. It serves as a support for the swiveling-lever 9, which is journaled thereon. Said lever is bifurcated, one arm of which is provided with a cylindrical opening, 10, through which passes the upper end of the cylindrical screw 3.

11 represents the lower arm, which is made of a separate section and detachably connected to the lever 9 by the screws 12. The other arm, 11, is furnished with a circular orifice, through which the screw 3 passes, so that said arm is journaled on the unthreaded part of the screw directly under the collar 8. In order to drive the said cylindrical screw 3, the outer periphery of this collar is provided with teeth A.

B represents a pawl secured between the forks of the lever by the pivot C.

D represents a coil-spring.

E represents a latch, the inner face of which is beveled and abuts against the pallet-pawl B. Said pawl B engages alternately with the teeth A, as desired. When it is desired to shift the pallet to have the opposite ends engage with the ratchet-teeth, pressure is applied to the free end, which moves the spring-latch E back and allows the pawl to turn on its center and bring the opposite end into engagement with the ratchet-teeth, when the spring will come back into position and hold it in said engagement. By this means of constructing the lever and the jack the lever is rotated in either direction upon its collar or journal 8, and the pallet-pawl by its engagement with the teeth A drives the cylindrical screw 3 in either direction for which it is set to raise or lower this jack, as desired, a very rapid movement is obtained, and the lever is quickly shifted to raise or lower the screw.

Having described my invention, what I claim is—

The combination, with the internally-threaded cylinder 1 and lifting-screw 6, of the internally and externally threaded nut 3, formed integral with the lateral toothed collar 8, and the lever 9, having two arms embracing the collar and journaled, respectively, on the screw above and below the collar, substantially as described.

In testimony whereof I have hereunto set my hand.

JACOB O. JOYCE.

Witnesses:
C. L. BAUMANN,
JOHN L. H. FRANK.